United States Patent
Mandelli et al.

(10) Patent No.: US 12,282,115 B2
(45) Date of Patent: Apr. 22, 2025

(54) CLUTTER REMOVAL

(71) Applicant: Nokia Solutions and Networks Oy, Espoo (FI)

(72) Inventors: Silvio Mandelli, Ludwigsburg (DE); Marcus Roland Henninger, Ludwigsburg (DE)

(73) Assignee: Nokia Solutions & Networks Oy, Espoo (FI)

( * ) Notice: Subject to any disclaimer, the term of this patent is extended or adjusted under 35 U.S.C. 154(b) by 0 days.

(21) Appl. No.: 18/582,826

(22) Filed: Feb. 21, 2024

(65) Prior Publication Data
US 2024/0288546 A1     Aug. 29, 2024

(30) Foreign Application Priority Data
Feb. 24, 2023   (FI) ..................... 20237037

(51) Int. Cl.
*G01S 7/41*   (2006.01)
*G01S 7/00*   (2006.01)

(52) U.S. Cl.
CPC ............ *G01S 7/414* (2013.01); *G01S 7/006* (2013.01)

(58) Field of Classification Search
CPC ........ G01S 7/414; G01S 7/292; G01S 7/2813; G01S 13/5244; G01S 7/40; G01S 7/4004; G01S 7/4021; G01S 7/41; G01S 13/04; G01S 7/415; G01S 7/2883; G01S 7/354; G06F 17/16
USPC .................................................. 342/159, 160
See application file for complete search history.

(56) References Cited

U.S. PATENT DOCUMENTS

| | | | | |
|---|---|---|---|---|
| 5,327,141 A | * | 7/1994 | Sheldon | G01S 13/524 342/159 |
| 5,539,412 A | * | 7/1996 | Mendelson | G01R 23/16 324/76.19 |
| 5,760,734 A | * | 6/1998 | Urkowitz | G01S 13/522 342/194 |

(Continued)

FOREIGN PATENT DOCUMENTS

| | | |
|---|---|---|
| CN | 111965612 A | 11/2020 |
| CN | 115412413 A | 11/2022 |

OTHER PUBLICATIONS

H. Urkowitz and H. S. Owen, "A matrix clutter processor for agile beam radars," Proceedings of the 1998 IEEE Radar Conference, RadarCon'98. Challenges in Radar Systems and Solutions (Cat. No. 98CH36197), Dallas, TX, USA, 1998, pp. 153-158, doi: 10.1109/NRC.1998.677993. (Year: 1998).*

(Continued)

*Primary Examiner* — Olumide Ajibade Akonai
(74) *Attorney, Agent, or Firm* — McCarter & English LLP (57) ABSTRACT

When sensing is performed in a radio access network, clutter may be removed from echo signals using clutter contributing signals, that may be determined based on clutter calibration matrices and one-dimensional echo signals obtained by transforming multi-dimensional representations of echo signals at least partly into the one-dimensional echo signals. When generating, for example, clutter calibration matrices, sensing results may be transformed into one dimensional vectors, that are arranged to two-dimensional matrices. Vectors associated with clutter components in two-dimensional matrices may be used to obtain the clutter calibration matrices.

19 Claims, 3 Drawing Sheets

(56) References Cited

U.S. PATENT DOCUMENTS

| | | | | |
|---|---|---|---|---|
| 2014/0333475 | A1* | 11/2014 | Sierwald | G01S 13/95 |
| | | | | 342/26 R |
| 2020/0256974 | A1* | 8/2020 | Kim | G01S 13/874 |
| 2022/0091232 | A1* | 3/2022 | Foreman | G01S 13/534 |
| 2022/0404466 | A1* | 12/2022 | Jones | G01S 7/414 |

OTHER PUBLICATIONS

Zhao, Z. et al., "Multipath clutter rejection for digital radio mondiale-based HF passive bistatic radar with OFDM waveform," IET Radar, Sonar and Navigation 2012, vol. 6, No. 9, pp. 867-872.

Zhang, A. J. et al., "An Overview of Signal Processing Techniques for Joint Communication and Radar Sensing," IEEE Journal of Selected Topics in Signal Processing, vol. 15, No. 6, Nov. 2021, pp. 1295-1315.

Henninger, M. et al., "CRAP: Clutter Removal with Acquisitions Under Phase Noise," arXiv, Jun. 1, 2023.

* cited by examiner

FIG.9

CLUTTER REMOVAL

TECHNICAL FIELD

Various example embodiments relate to communication systems.

BACKGROUND

Communication systems are under constant development. The 5G (fifth generation), 5G-Advanced, and beyond future wireless networks, or network generations, aim to support a large variety of services, use cases and industrial verticals. It is envisaged that there will be use cases that will use joint communication and sensing. Basic idea of joint communication and sensing is that the sensing makes use of reflections of radio signals with a minimum overhead with regard to communication operations. To better sense targets of interest, joint communication and sensing may implement clutter removal.

SUMMARY

The independent claims define the scope, and different embodiments are defined in dependent claims.

According to an aspect there is provided an apparatus comprising at least one processor and at least one memory storing instructions that, when executed by the at least one processor, cause the apparatus to at least: obtain at least one clutter calibration matrix comprising a subset of clutter components determined based on a plurality of sensing results of an environment comprising clutter; transform multi-dimensional representations of echo signals received at least partly into one-dimensional echo signals; determine one-dimensional clutter contributing signals based on corresponding one-dimensional echo signals and at least one of the at least one clutter calibration matrix; and remove clutter from multi-dimensional representations of echo signals using the one-dimensional clutter contributing signals.

In embodiments, the at least one processor and the at least one memory storing instructions, when executed by the at least one processor, further cause the apparatus at least to: remove the clutter by subtracting the one-dimensional clutter contributing signals from the one-dimensional echo signals; and transform subtraction results into multi-dimensional representations of echo signals.

In embodiments, the at least one processor and the at least one memory storing instructions, when executed by the at least one processor, further cause the apparatus at least to: transform the one-dimensional clutter contributing signals into multi-dimensional representations of clutter contributing signals; and remove the clutter by subtracting the multi-dimensional representations of clutter contributing signals from the multi-dimensional representations of echo signals.

In embodiments, the at least one processor and the at least one memory storing instructions, when executed by the at least one processor, further cause the apparatus at least to apply, per a one-dimensional echo signal, a projection of one clutter calibration matrix to the one-dimensional echo signal to determine the one-dimensional clutter contributing signal.

In embodiments, the at least one processor and the at least one memory storing instructions, when executed by the at least one processor, further cause the apparatus at least to: obtain at least one set of two or more clutter calibration matrices, that are based on one calibration matrix comprising the subset of clutter components determined based on a plurality of sensing results of the environment comprising the clutter, the two or more clutter calibration matrices in a set being pre-computed parts of a projection matrix of the one calibration matrix; and determine, per a one-dimensional echo signal, the one-dimensional clutter contributing signal by multiplying the one-dimensional echo signal with the two or more clutter calibration matrices in sequence.

In embodiments, the at least one processor and the at least one memory storing instructions, when executed by the at least one processor, further cause the apparatus at least to: receive echo signals during one sensing occasion over two or more beams; obtain at least one clutter calibration matrix per a beam; and remove clutter per a beam.

In embodiments, the at least one processor and the at least one memory storing instructions, when executed by the at least one processor, further cause the apparatus at least to: slice, per a multi-dimensional representation of an echo signal, the multi-dimensional representation into a plurality of multi-dimensional chunks; and transform the multi-dimensional chunks at least partly into the one-dimensional echo signals.

In embodiments, the at least one processor and the at least one memory storing instructions, when executed by the at least one processor, further cause the apparatus to: under-sample the multi-dimensional representations of echo signals received; transform under-sampled representations of echo signals at least partly into the one-dimensional echo signals; and apply, after removing clutter, interpolation to the multi-dimensional representations of echo signals.

In embodiments, the at least one processor and the at least one memory storing instructions, when executed by the at least one processor, further cause the apparatus at least to: obtain the plurality of sensing results; transform sensing results at least partly into one-dimensional vectors comprising at least the frequency domain of the sensing results; arrange the one-dimensional vectors to at least one two-dimensional matrix; form, using the at least one two-dimensional matrix, at least one calibration matrix, wherein the at least one calibration matrix comprises vectors associated with clutter components in the at least one two-dimensional matrix; determine at least one clutter calibration matrix based on the calibration matrix; and store the at least one clutter calibration matrix.

According to an aspect there is provided an apparatus comprising at least one processor and at least one memory storing instructions that, when executed by the at least one processor, cause the apparatus to at least: obtain a plurality of sensing results of an environment comprising clutter, the plurality of the sensing results being a plurality of multi-dimensional representations of echo signals; transform sensing results at least partly into one or more one-dimensional vectors comprising at least the frequency domain of the multi-dimensional representations of the echo signals; arrange the one-dimensional vectors to at least one two-dimensional matrix; form, using the at least one two-dimensional matrix, at least one calibration matrix, wherein the at least one calibration matrix comprises vectors associated with clutter components in the at least one two-dimensional matrix; determine at least one clutter calibration matrix based on the at least one calibration matrix; and store the at least one clutter calibration matrix.

In embodiments, the at least one processor and the at least one memory storing instructions, when executed by the at least one processor, further cause the apparatus at least to scale at least one of the sensing results before transforming the at least one of sensing results into the one-dimensional vectors.

In embodiments, the at least one processor and the at least one memory storing instructions, when executed by the at least one processor, further cause the apparatus at least to: under-sample the sensing results; and transform under-sampled sensing results at least partly into the one-dimensional vectors.

In embodiments, the at least one processor and the at least one memory storing instructions, when executed by the at least one processor, further cause the apparatus at least to: extract clutter components from the at least one two-dimensional matrix; and form the at least one calibration matrix to contain vectors associated with L clutter components.

In embodiments, the at least one processor and the at least one memory storing instructions, when executed by the at least one processor, further cause the apparatus at least to: extract clutter components from the at least one two-dimensional matrix by performing a singular value decomposition to the at least one two-dimensional matrix; determine, after the singular value decomposition, clutter order L of the one-dimensional vectors, by applying minimum description length; and extract vectors associated with the L strongest clutter components based on the clutter order to form the at least one calibration matrix.

In embodiments, the at least one processor and the at least one memory storing instructions, when executed by the at least one processor, further cause the apparatus at least to determine at least one set of two or more clutter calibration matrices, that are based on one calibration matrix, the two or more clutter calibration matrices in a set being pre-computed parts of a projection matrix of the one calibration matrix.

In embodiments, the at least one processor and the at least one memory storing instructions, when executed by the at least one processor, further cause the apparatus at least to: store sensing results on the environment comprising clutter; obtain the sensing results according to an elapsed time between the obtaining and storing of a sensing result; and scale the sensing result obtained based on the elapsed time prior to transforming the sensing result into a one-dimensional vector.

In embodiments, the at least one processor and the at least one memory storing instructions, when executed by the at least one processor, further cause the apparatus at least to obtain the plurality of sensing results by performing transmitting sensing signals and obtaining representations of echoing signals.

In embodiments, the plurality of sensing results comprises a preset number of the sensing results.

According to an aspect there is provided a method comprising: obtaining at least one clutter calibration matrix comprising a subset of clutter components determined based on a plurality of sensing results of an environment comprising clutter; transforming multi-dimensional representations of echo signals received at least partly into one-dimensional echo signals; determining one-dimensional clutter contributing signals based on corresponding one-dimensional echo signals and at least one of the at least one clutter calibration matrix; and removing clutter from multi-dimensional representations of echo signals using the one-dimensional clutter contributing signals.

According to an aspect there is provided a method comprising: obtaining a plurality of sensing results of an environment comprising clutter, the plurality of the sensing results being a plurality of multi-dimensional representations of echo signals; transforming sensing results at least partly into one or more one-dimensional vectors comprising at least the frequency domain of the multi-dimensional representations of the echo signals; arranging the one-dimensional vectors to at least one two-dimensional matrix; forming, using the at least one two-dimensional matrix, at least one calibration matrix, wherein the at least one calibration matrix comprises vectors associated with clutter components in the at least one two-dimensional matrix; determining at least one clutter calibration matrix based on the at least one calibration matrix; and storing the at least one clutter calibration matrix.

According to an aspect there is provided an apparatus comprising means for performing any of the methods.

According to an aspect there is provided a computer readable medium comprising instructions stored thereon for performing at least one of a first process or a second process, wherein the first process comprises at least the following: obtaining at least one clutter calibration matrix comprising a subset of clutter components determined based on a plurality of sensing results of an environment comprising clutter; transforming multi-dimensional representations of echo signals received at least partly into one-dimensional echo signals; determining one-dimensional clutter contributing signals based on corresponding one-dimensional echo signals and at least one of the at least one clutter calibration matrix; and removing clutter from multi-dimensional representations of echo signals using the one-dimensional clutter contributing signals, wherein the second process comprises at least the following: obtaining a plurality of sensing results of an environment comprising clutter, the plurality of the sensing results being a plurality of multi-dimensional representations of echo signals; transforming sensing results at least partly into one or more one-dimensional vectors comprising at least the frequency domain of the multi-dimensional representations of the echo signals; arranging the one-dimensional vectors to at least one two-dimensional matrix; forming, using the at least one two-dimensional matrix, at least one calibration matrix, wherein the at least one calibration matrix comprises vectors associated with clutter components in the at least one two-dimensional matrix; determining at least one clutter calibration matrix based on the at least one calibration matrix; and storing the at least one clutter calibration matrix.

In an embodiment, the computer readable medium is a non-transitory computer readable medium.

According to an aspect there is provided a computer program comprising instructions which, when executed by an apparatus, cause the apparatus to perform at least one of a first process or a second process, wherein the first process comprises at least the following: obtaining at least one clutter calibration matrix comprising a subset of clutter components determined based on a plurality of sensing results of an environment comprising clutter; transforming multi-dimensional representations of echo signals received at least partly into one-dimensional echo signals; determining one-dimensional clutter contributing signals based on corresponding one-dimensional echo signals and at least one of the at least one clutter calibration matrix; and removing clutter from multi-dimensional representations of echo signals using the one-dimensional clutter contributing signals, wherein the second process comprises at least the following: obtaining a plurality of sensing results of an environment comprising clutter, the plurality of the sensing results being a plurality of multi-dimensional representations of echo signals; transforming sensing results at least partly into one or more one-dimensional vectors comprising at least the frequency domain of the multi-dimensional representations of the echo signals; arranging the one-dimensional vectors to at least one two-dimensional matrix; forming, using the at least one two-dimensional matrix, at least one calibration matrix, wherein the at least one calibration matrix comprises vectors associated with clutter components in the at least one two-dimensional matrix; determining at least one clutter calibration matrix based on the at least one calibration matrix; and storing the at least one clutter calibration matrix.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are only presented as examples. Although the specification may refer to "an", "one", or "some" embodiment(s) and/or example(s) in several locations, this does not necessarily mean that each such reference is to the same embodiment(s) or example(s), or that a particular feature only applies to a single embodiment and/or single example. Single features of different embodiments and/or examples may also be combined to provide other embodiments and/or examples. Furthermore, words "comprising" and "including" should be understood as not limiting the described embodiments to consist of only those features that have been mentioned and such embodiments may contain also features/structures that have not been specifically mentioned.

5G-Advanced, and beyond future wireless networks aim to support a large variety of services, use cases and industrial verticals, for example unmanned mobility with fully autonomous connected vehicles, other vehicle-to-everything (V2X) services, or smart environment, e.g. smart industry, smart power grid, or smart city, just to name few examples. To provide a variety of services with different requirements, such as enhanced mobile broadband, ultra-reliable low latency communication, massive machine type communication, wireless networks are envisaged to adopt network slicing, flexible decentralized and/or distributed computing systems and ubiquitous computing, with local spectrum licensing, spectrum sharing, infrastructure sharing, and intelligent automated management underpinned by mobile edge computing, artificial intelligence, for example machine learning, based tools, cloudification and blockchain technologies. For example, in the network slicing multiple independent and dedicated network slice instances may be created within the same infrastructure to run services that have different requirements on latency, reliability, throughput and mobility. 6G (sixth generation) networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, joint communication and sensing, reduction of energy footprint, trustworthy infrastructure, scalability and affordability. In addition to these, 6G is also targeting new use cases covering the integration of localization and sensing capabilities into system definition to unifying user experience across physical and digital worlds.

Figure 1:
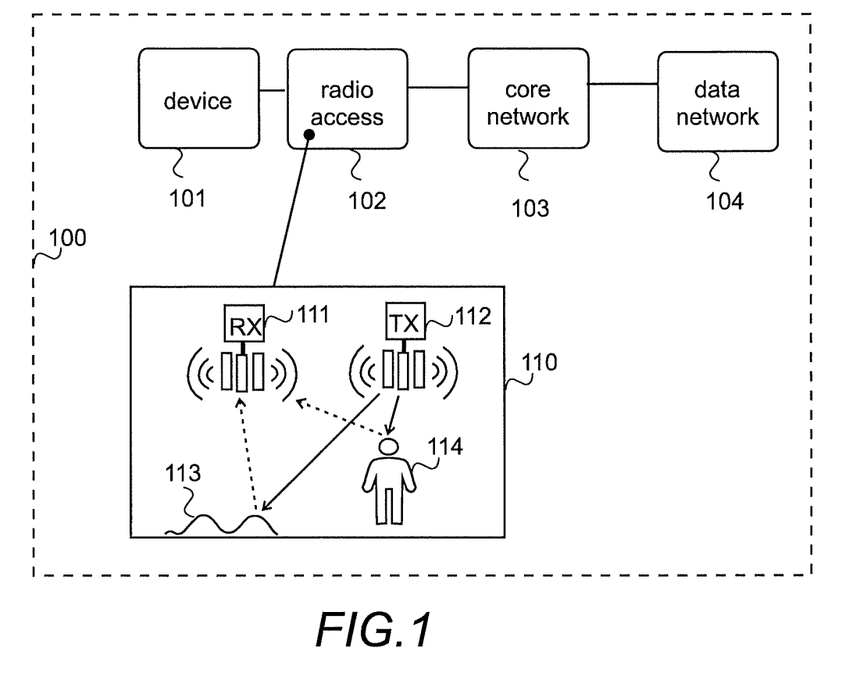
FIG. 1 illustrates an exemplified high-level network architecture.

FIG. 1 illustrates an exemplified high-level network architecture of a communication system with a highly simplified sensing arrangement, only showing some details, the more detailed implementation being irrelevant for the description of examples. The examples are described herein using principles and terminology of 5G-Advanced, without limiting the examples, and the terminology used, to said 5G-Advanced. A person skilled in the art may apply the solutions and examples to other communication systems, for example beyond 5G-Advanced, or communication system implementing similar principles and functionalities, possibly with different terms having corresponding meaning, but using some other than 5G technology.

In the non-limiting example of FIG. 1, software-based components of the system 100 comprise device components 101 for device functionalities in device domain, radio access network components 102 for access network functionalities in a radio access network domain, core network components 103 for core network functionalities in core network domain, and data network components 104 for data network functionalities in data network domain. Components (elements, functional units) of service-based architecture may be implemented as applications, defined using network functions that may be cloud-native network functions, for example virtualized network functions or container network functions.

A device component 101 may be any electrical device connectable to an access network. The device may be a user equipment, a vehicle, an Internet of things device, an industrial Internet of things device, on-person device, like wearable device, just to mention a few non-limiting examples.

The radio access network domain 102, may be a 5G-Advanced access network, an open radio access network, a cloud radio access network, a legacy cellular radio access network, a non-terrestrial network, or a non-cellular access network, for example a wireless local area network, comprising entities implementing radio sensing. In other words, the radio access network domain may use any radio interface technology that enable sensing according to embodiments and examples described herein.

The core network domain 103, may be a non-standalone core network, for example be a long term evolution, LTE-based network, or a standalone access network, for example a 5G core network. However, it should be appreciated that the core network domain may use any technology that enables network services, for example, to be delivered between devices and data networks.

The data network, or the data network domain 104, may be any network, like the Internet, an intranet, a wide area network, etc. Different remote monitoring and/or data collection services for different use cases may be reached via the data network 104.

To provide the wireless access, the radio access network 102 comprises access devices which may provide one or more cells. There are a wide variety of access devices, including different types of base stations, such as eNBs, gNBs, split gNBs, transmission-reception points, network-controlled repeaters, donor nodes in integrated access and backhaul (IAB), fixed IAB nodes, nodes operationally coupled to one or more remote radio heads, base stations comprising radio parts, etc. The access devices provide wireless connections for communication by transmitting and receiving radio signals via antenna units that may comprise a plurality of antennas or antenna elements, for example for multiple-input, multiple-output (MIMO) technology. The access nodes may be configured to transmit radio signals over beams, and for beam management to perform beam sweeping. The beam sweeping is a technique to transmit beams in different directions in a burst. For sensing purposes, radio signals for sensing may be transmitted in a similar manner.

The highly simplified example of the sensing arrangement comprises an environment 110 in which sensing according to embodiments and examples may be performed. The environment 110 may be any environment, for example a room or a corridor but it may be also an outdoor environment. In the illustrated example, the sensing arrangement comprises a receiver (RX) 111 and a transmitter (TX) 112 that are co-located. However, it should be appreciated that the sensing arrangement may as well be a bi-static arrangement, in which the receiver and the transmitter are not co-located or multi-static arrangements with multiple receivers 111, which all may be configured to perform the below described processes, or some of them. The transmitter and the receiver may be different entities, e.g. different nodes in a radio access network, or different antenna panels in one entity, the antenna panels not sharing a local oscillator, which may cause phase incoherencies between them.

When the transmitter 112 transmits, during a sensing occurrence, one or more sensing signals, depicted by solid line arrows in FIG. 1, the receiver 111 receives echo signals, depicted by dash line arrows in FIG. 1. When orthogonal frequency division multiplexing (OFDM) sensing technology (radar technology) is applied, symbols transmitted by the transmitter 112 in a sensing signal may be known at the receiver 111, so that the receiver may obtain a channel via element-wise division. The echo signals are reflections of the sensing signals, reflecting from objects 113, 114 in the environment. In the illustrated example one of the objects is a clutter entity, i.e. an object 113 of no interest for the sensing use case, and thereby causing unwanted reflections. For example, the clutter entity 113 may be a curtain causing clutter 113, which, if not removed, makes detection and tracking of objects of interest, for example humans 114, or other slowly moving, or even static objects, more difficult. A clutter removal using zero Doppler cancellation mechanisms is insufficient for such use cases. In the below examples, computationally efficient and phase-coherent clutter removal solutions, that maintain zero Doppler information, which enable detecting at least slowly moving or static objects of interest will be discussed. The clutter removal solutions are based on generating clutter calibration matrices using a plurality of sensing results of the environment comprising clutter entities, and preferably no targets of interest, i.e. sensing a reference of the environment, and then using the matrices thus generated to detect targets of interest during sensing for use cases. In other words, two phase clutter removing examples are disclosed. One of the phases generates the matrices and the other one performs clutter removal. The phases may be performed by different entities and/or by one entity, and once there exist matrices the phases may run in parallel. The plurality of sensing results may be obtained by performing the sensing multiple times, for example 50, 80, 100 or 150 times, which helps to reduce the impact of noise by averaging out the noise, and to capture multiple clutter components, for example movement of a curtain (object 113 of no interest).

Figure 2:
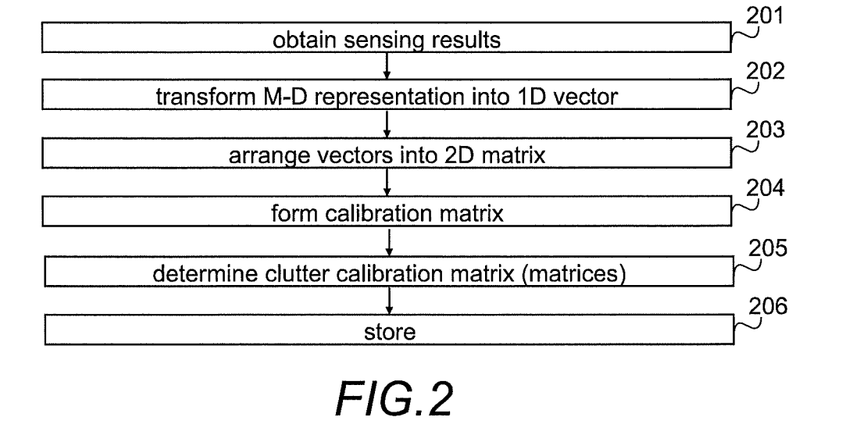
FIG. 2 illustrates an example functionality.
Figure 3:
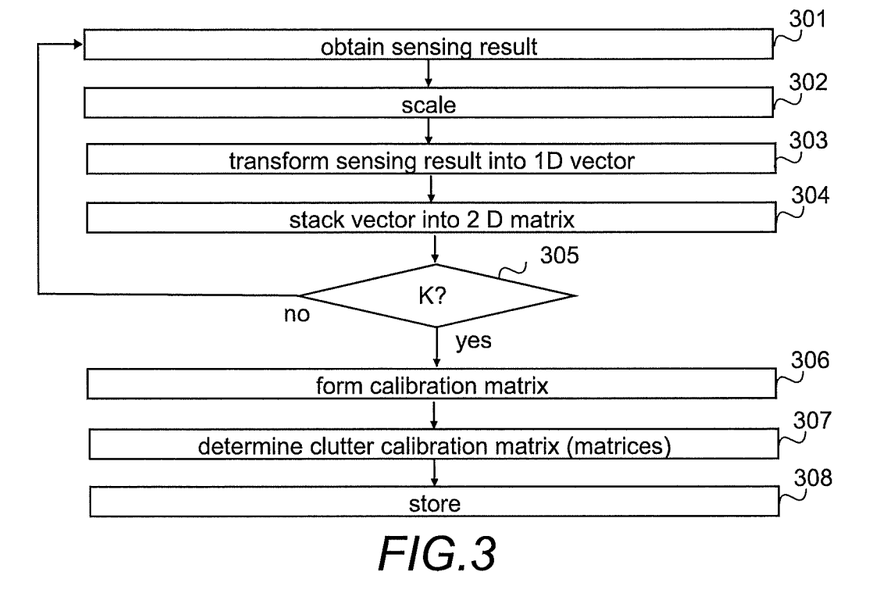
FIG. 3 illustrates an example functionality.

FIG. 2 and FIG. 3 illustrate different examples of processes to generate clutter calibration matrices. The processes may be performed when the sensing arrangement is taken into use, and/or triggered randomly or periodically, or performed as a background process, for example to update changes of objects of no interest in the environment. The processes may use earlier obtained (acquired) sensing results (acquisitions), or use newly obtained sensing results, or both. Further, the process may be run by a separate entity, which does not perform sensing, but obtains sensing results from a sensing apparatus. When beam sweeping is used for the sensing signals, the processes may be performed per a beam.

Referring to FIG. 2, a plurality of sensing results of an environment comprising clutter is obtained in block 201. The plurality of the sensing results is a plurality of multi-dimensional representations of echo signals. Then the sensing results are at least partly transformed in block 202 into one-dimensional vectors. In other words, the sensing results are vectorized by collapsing all dimensions into one-dimension. In an embodiment, the multi-dimensional representations of echo signals are transformed in block 202. In an embodiment (a slicing embodiment), the multi-dimensional representations of echo signals are sliced, per a multi-dimensional representation of an echo signal, into a plurality of multi-dimensional chunks, and the multi-dimensional chunks are transformed in block 202 at least partly into the one-dimensional vectors. In a further embodiment, combinable with the slicing embodiment, the multi-dimensional representations of echo signals received are under-sampled, and the under-sampled representations of echo signals are transformed in block 202 at least partly into the one-dimensional vectors. Still further possibilities, combinable with the slicing and/or under-sampling, include transforming representations into the one-dimensional echo signals comprising at least the frequency domain, for example symbol by symbol for an OFDM signal.

For example, a following sensing result, which is a two-dimensional time-frequency representation of an echo signal, for example, an OFDM signal with N subcarriers and M symbols $$\text{e.g.} \begin{bmatrix} h_{1,1} & \cdots & h_{1,M} \\ \vdots & \ddots & \vdots \\ h_{N,1} & \cdots & h_{N,M} \end{bmatrix}$$

may be transformed into the following one-dimensional row vector of length Q=NM:

$$[h_{1,1} \ldots h_{1,M} \ldots h_{N,1} \ldots h_{N,M}]$$

It should be appreciated that the one-dimensional vector may also be a column vector. However, herein, for the clarity of the description, the examples use the row vector. Applying the below principles to column vectors is a straightforward task for one skilled in the art.

The one-dimensional vectors are arranged in block 203 to at least one two-dimensional matrix C. However, for the sake of clarity of description, in the examples it is assumed that there is one two-dimensional matrix C. For example, the row vectors may be stacked. Assuming that block 202 results to K one-dimensional vectors, the size of the matrix C is K×Q.

Then, using the two-dimensional matrix C, a calibration matrix is formed in block 204. The calibration matrix may comprise the strongest clutter components from the two-dimensional matrix C. For example, from the two-dimensional matrix C, a number of clutter components may be extracted, and a calibration matrix that contains the extracted clutter components may be formed. It should be appreciated that not all clutter components in the two-dimensional matrix are extracted. In other words, vectors associated to L clutter components of C, for example to L strongest clutter components, are considered as the clutter subspace C (of dimension L×Q) to be used for clutter removal L is a positive integer, the value of which is smaller than K. In some implementations the value may be equal to K, if K is a small integer. The value of L may be a pre-set value, or it may be determined during the process. For example, if K=100, L may be between 2 to 5.

In an implementation, forming a calibration matrix C comprises extracting the L strongest clutter components (vectors associated with the L strongest clutter components) from the two-dimensional matrix C by performing a singular value decomposition (SVD) to the two-dimensional matrix, and determining clutter order of the one-dimensional vectors by applying a model estimation technique, for example minimum description length (MDL), and forming the calibration matrix to contain the L vectors associated with the L strongest clutter components. In other words, in an implementation, in block 204 the K×Q matrix C is further processed to extract the L strongest clutter components. First, the SVD is performed as $$C = U\Sigma V^H \quad (2)$$

Next, the clutter order L is determined. The clutter order L may be determined as a function of the singular values using the MDL. The L right singular vectors corresponding to the L strongest singular values of C in $\Sigma$ are then used to form the calibration matrix, i.e., an L×Q matrix $\hat{C}$. This allows to obtain a clutter representation that is invariant to constant phase rotations of a single sensing result.

Then, at least one clutter calibration matrix based on the calibration matrix formed in block 205 is determined in block 206 and the at least one clutter calibration matrix is stored in block 206 to be used for clutter removal.

In an implementation, the calibration matrix $\hat{C}$ is determined in block 205 to be the clutter calibration matrix.

In another implementation, a clutter calibration matrix is determined in block 205 to be a projection matrix P of the calibration matrix. For example, the projection matrix may be calculated using equation (3)

$$P = \hat{C}^H \left( \hat{C}\hat{C}^H \right)^{-1} \hat{C} \quad (3)$$

wherein $\hat{C}^H$ is the conjugate transpose matrix of the calibration matrix $\hat{C}$.

In still further implementations a set of two or more clutter calibration matrices are determined in block 205 based on the calibration matrix, the two or more clutter calibration matrices in a set being pre-computed parts of the projection matrix of the one calibration matrix. The set may comprise the following two pre-calculated matrices:

$$\hat{C}^H \text{ and } \hat{C}_{CAL} \text{ wherein } \hat{C}_{CAL} = \left( \hat{C}\hat{C}^H \right)^{-1} \hat{C}. \quad (4)$$

FIG. 3 illustrates an example in which sensing results (acquisitions) are processed one by one to enable scaling.

Referring to FIG. 3, in the illustrated example, a sensing result of the environment comprising clutter is obtained in block 301. The sensing result may be a sensing result obtained earlier and stored for later use, or the sensing result may be obtained by transmitting, or causing another entity, for example a transmitter, to transmit, a sensing signal in the environment, preferably when there are no objects of interest in the environment, and receiving an echo signal, the sensing result being a multi-dimensional representation of the echo signal. Further, sensing result may be obtained from newest to oldest, or from newest to oldest up to a certain lifetime, and if there is not enough sensing results, sensing result may be obtained by transmitting, or causing another entity to transmit, one or more sensing signals in the environment, preferably when there are no objects of interest in the environment, and receiving echo signals.

In the illustrated example, the sensing result is scaled in block 302. For example, the sensing result may be scaled based on received power of the sensing result, and/or based on elapsed time between obtaining time or storing time and the scaling time, i.e. time prior to transforming the sensing result into a one-dimensional vector. By the scaling, it is possible to obtain same power for sensing results (acquisition), or same power for sensing results close in time, or reduce power the more time has elapsed.

Then the sensing result is transformed in block 303 into a one-dimensional vector, as described above with block 202, and the one-dimensional vector is stacked in block 304 to a two-dimensional matrix C.

Then it is checked in block 305, whether K sensing results have been processed. If not (block 305: no), the process returns to block 301.

If K sensing results have been processed (block 305: yes), a calibration matrix is formed in block 306, for example as described with block 204, one or more clutter matrices are determined in block 307, for example as described with block 205, and the one or more one clutter calibration matrices are stored in block 308 to be used for clutter removal.

In an embodiment (a slicing embodiment), the multi-dimensional representations of echo signals are sliced, per a multi-dimensional representation of an echo signal, into a plurality of multi-dimensional chunks either before scaling in block 302 or after scaling. In a further embodiment, combinable with the slicing embodiment, the multi-dimensional representation is under-sampled either before scaling in block 302 or after scaling. Still further possibilities, combinable with the slicing and/or under-sampling, include transforming representations into the one-dimensional echo signals in frequency domain, for example symbol by symbol for an OFDM signal, either before scaling in block 302 or after scaling.

FIG. 4 to FIG. 7 illustrate examples of processes to remove clutter.

Figure 4:
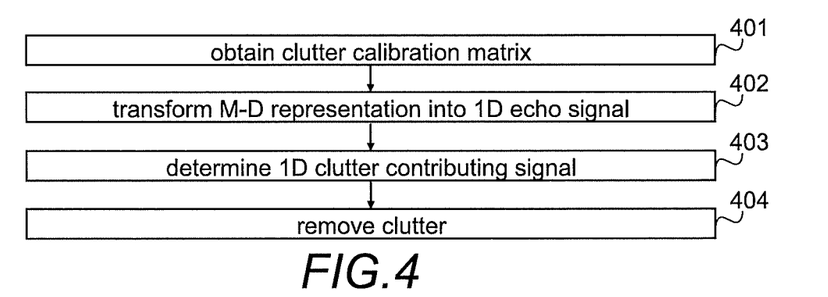
FIG. 4 illustrates an example functionality.

Referring to FIG. 4, at least one clutter calibration matrix is obtained in block 401 for clutter removal. Different examples of clutter calibration matrices are described above with FIG. 2. The obtaining may be performed by the apparatus updating or generating the at least one clutter calibration matrix, or the apparatus being configured with the at least one clutter calibration matrix. It should be appreciated that the obtaining also covers updating, or receiving updates.

For clutter removal, multi-dimensional representations S of echo signals received are transformed in block 402 at least partly into one-dimensional echo signals s, in a similar way as described with block 202, an echo signal corresponding to a vector in block 202. It should be appreciated that the transformation will be performed using same principles that were used with the at least one clutter calibration matrix. For example, if slicing and/or under-sampling and/or symbol by symbol transformation were performed, corresponding process is applied also herein.

Then one-dimensional clutter contributing signals $\hat{r}$ are determined in block 403 based on corresponding one-dimensional echo signals s and at least one of the at least one clutter calibration matrix obtained in block 401.

When the clutter calibration matrix is the calibration matrix $\hat{C}$, the clutter contributing signals $\hat{r}$ may be computed (determined) in block 403 using equation (5)

$$\hat{r} = s\hat{C}^H \left(\hat{C}\hat{C}^H\right)^{-1} \hat{C} \tag{5}$$

wherein $\hat{C}^H$ is the conjugate transpose matrix of the calibration matrix $\hat{C}$.

When the clutter calibration matrix is the projection matrix P, the clutter contributing signals $\hat{r}$ may be computed (determined) in block 403 using equation (6)

$$\hat{r} = sP \tag{6}$$

When a set of clutter calibration matrices, comprising for example $\hat{C}^H$ and $\hat{C}_{CAL}$, is obtained in block 401, the clutter contributing signals $\hat{r}$ may be computed (determined) in block 403 using equation (7) in which clutter calibration matrices are used in a sequential order:

$$\hat{r} = \left(s\hat{C}^H\right)\hat{C}_{CAL} \tag{7}$$

Then clutter is removed in block 404 from the multi-dimensional representations of echo signal using the clutter contributing signals, resulting to clutter-free, or almost clutter-free multi-dimensional representations of echo signals to be used for detecting objects of interest. Such representations may be called clutter-rejected representations. In other words, for an OFDM echo signal, a clutter-rejected matrix $\hat{S}$ may be obtained in block 404 per a multi-dimensional representation S of the echo signal. The clutter-rejected matrix $\hat{S}$ can be readily used for further radar processing.

Figure 5:
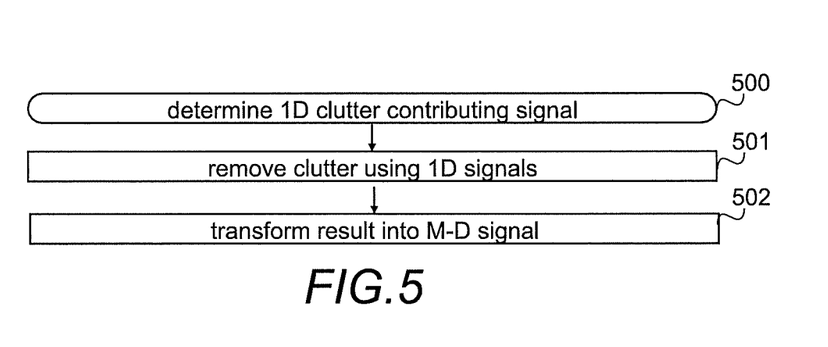
FIG. 5 illustrates an example functionality.
Figure 6:
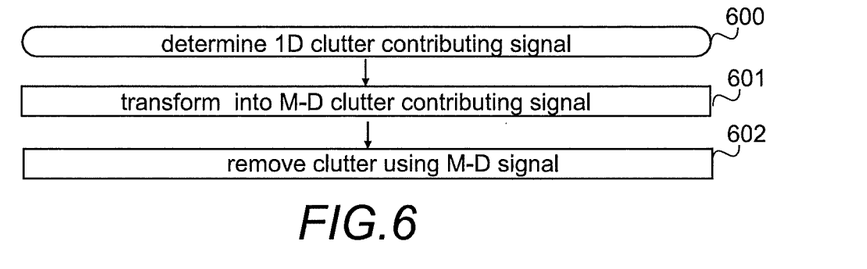
FIG. 6 illustrates an example functionality.
Figure 7:
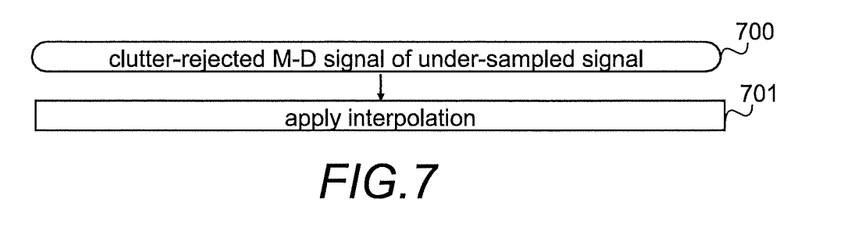
FIG. 7 illustrates an example functionality.

FIG. 5, FIG. 6 and FIG. 7 describe more detailed examples how to obtain such multi-dimensional representations of clutter-rejected echo signals 5.

Referring to FIG. 5, when the one-dimensional clutter contributing signal $\hat{r}$ has been determined (block 500), the clutter is removed in block 501 by subtracting the one-dimensional clutter contributing signal $\hat{r}$ from the one-dimensional echo signal s (determined in block 402), and then the subtraction result s is transformed (reshaped) in block 502 into a multi-dimensional (clutter-rejected) representation of echo signal $\hat{S}$ having the shape of original S.

Referring to FIG. 6, when the one-dimensional clutter contributing signal $\hat{r}$ has been determined (block 600), the one-dimensional clutter contributing signal is transformed (reshaped) in block 601 into a multi-dimensional representation $\hat{R}$ of the clutter contributing signal $\hat{r}$. The clutter is removed in block 602 clutter by subtracting the multi-dimensional representation R of the clutter contributing signal from the multi-dimensional representation S of the echo signal, the result being a multi-dimensional (clutter-rejected) representation of echo signal $\hat{S}$. Depending on an implementation, the multi-dimensional representations S of echo signals received may be temporarily stored when received for the use in block 602, or by reshaping s back to its original shape in block 602.

FIG. 7 illustrates an example for the embodiment in which multi-dimensional representations of echo signals received are under-sampled, and after that processed to a multi-dimensional (clutter-rejected) representation of under-sampled echo signal (block 700). In the example, after clutter has been removed and the result reshaped to the multi-dimensional representation, interpolation is applied in block 701 to the result to at least partly recover the information lost by under-sampling, resulting to a multi-dimensional (clutter-rejected) representation of echo signal S. Hence, radar processing techniques that are usable for representations that have not undergone the under-sampling, may be used also in embodiments implementing the under-sampling.

The blocks and related functions described above by means of FIG. 1 to FIG. 7 are in no absolute chronological order, and some of them may be performed simultaneously or in an order differing from the given one. Other functions can also be executed between them or within them, and other information may be transmitted, and/or other rules applied. Some of the blocks or part of the blocks or one or more pieces of information can also be left out or replaced by a corresponding block or part of the block or one or more pieces of information. Furthermore, some of the blocks in one example may be combined with another example.

Figure 8:
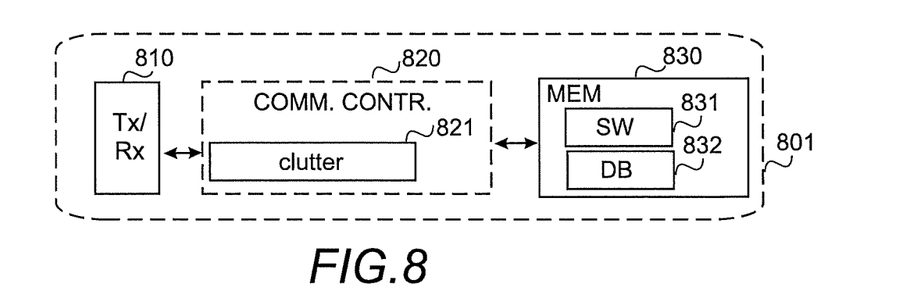
FIG. 8 is a schematic block diagram.
Figure 9:
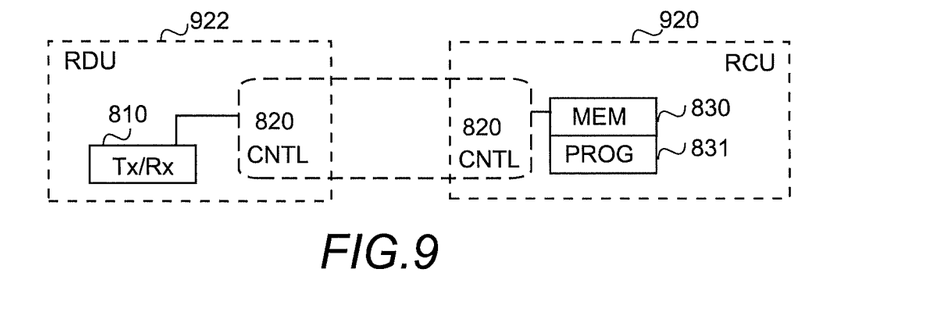
FIG. 9 is a schematic block diagram.

FIG. 8 illustrates an apparatus 801 according to some embodiments. The apparatus 801 may be any apparatus, or electronic device, that may be configured to process echo signals received in a radio access network. FIG. 9 illustrates an apparatus that may implement distributed functionality of the apparatus illustrated in FIG. 8. Different examples of such apparatuses are described above.

The apparatus 801 may comprise one or more communication control circuitries 820, such as at least one processor, and at least one memory 830, including one or more algorithms 831, such as a computer program code (software, SW, or instructions) wherein the at least one memory and the computer program code (software) are configured, with the at least one processor, to cause the apparatus to carry out any one of the exemplified functionalities of a corresponding apparatus, described above with any of FIG. 1 to FIG. 7. Said at least one memory 830 may also comprise at least one database (DB) 832.

Referring to FIG. 8, the one or more communication control circuitry 820 of the apparatus 801 comprise at least a clutter circuitry 821, which is configured to generate (determine) clutter calibration matrices, as discussed with FIG. 2 and FIG. 3, and/or to remove clutter as discussed with FIG. 4 to FIG. 7. Further, the clutter circuitry 821 may be configured to cause transmissions of sensing signals for obtaining enough sensing results to determine clutter calibration matrices. To this end, the clutter circuitry 821 of the apparatus 801 is configured to carry out at least some of the functionalities described above, e.g., by means of FIG. 1 to FIG. 7, for example, using one or more individual circuitries.

Referring to FIG. 8, the memory 830 may be implemented using any suitable data storage technology, such as semiconductor based memory devices, flash memory, magnetic memory devices and systems, optical memory devices and systems, fixed memory and removable memory.

Referring to FIG. 8, the apparatus 801 may further comprise different interfaces 810 such as one or more communication interfaces (TX/RX) comprising hardware and/or software for realizing communication connectivity according to one or more communication protocols and/or for realizing sensing, for example joint communication and sensing. The one or more communication interfaces 810 may enable connecting to the Internet and/or to a core network of a wireless communications network and/or to a radio access network and/or to other apparatuses within range of the apparatus. The one or more communication interface 810 may provide the apparatus with communication capabilities to sense and/or transmit sensing signals, and possibly also communicate in a cellular communication system and enable communication to different network nodes or elements or devices, for example. The one or more communication interfaces 810 may comprise standard well-known components such as an amplifier, filter, frequency-converter, (de)modulator, and encoder/decoder circuitries, controlled by the corresponding controlling units, and one or more antennas.

In an embodiment, as shown in FIG. 9, at least some of the functionalities of the apparatus of FIG. 8 may be shared between two physically separate devices, forming one operational entity. Therefore, the apparatus may be seen to depict the operational entity comprising one or more physically separate devices for executing at least some of the described processes. Thus, the apparatus of FIG. 9, utilizing such shared architecture, may comprise a remote control unit RCU 920, such as a host computer or a server computer, operatively coupled (e.g. via a wireless or wired network) to a remote distributed unit RDU 922 located in a base station, for example. In an embodiment, at least some of the described processes may be performed by the RCU 920. In an embodiment, the execution of at least some of the described processes may be shared among the RDU 922 and the RCU 920.

Similar to FIG. 8, the apparatus of FIG. 9 may comprise one or more communication control circuitry (CNTL) 820, such as at least one processor, and at least one memory (MEM) 830, including one or more algorithms (PROG) 831, such as a computer program code (software SW, or instructions) wherein the at least one memory and the computer program code (software, instructions) are configured, with the at least one processor, to cause the apparatus to carry out any one of the exemplified functionalities described above, e.g., by means of FIG. 1 to FIG. 7, for example.

In an embodiment, the RCU 920 may generate a virtual network through which the RCU 920 communicates with the RDU 922. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

According to an embodiment, there is a system that comprises at least one or more apparatuses configured to transmit sensing signals, for example for obtaining enough sensing results to determine clutter calibration matrices, and/or for sensing purposes, one or more apparatuses that are configured to remove clutter as discussed with FIG. 4 to FIG. 7, and one or more apparatuses configured to generate (determine) clutter calibration matrices, as discussed with FIG. 2 and FIG. 3.

According to an embodiment, there is a system that comprises one or more apparatuses configured to transmit sensing signals, for example for obtaining enough sensing results to determine clutter calibration matrices, and/or for sensing purposes, and one or more apparatuses that are configured to remove clutter as discussed with FIG. 4 to FIG. 7, and to generate (determine) clutter calibration matrices, as discussed with FIG. 2 and FIG. 3.

According to an embodiment, there is a system that comprises at least one or more apparatuses configured to transmit sensing signals, for example for obtaining enough sensing results to determine clutter calibration matrices, and/or for sensing purposes, one or more apparatuses that are configured to remove clutter as discussed with FIG. 4 to FIG. 7, and one or more apparatuses configured to generate (determine) clutter calibration matrices, as discussed with FIG. 2 and FIG. 3. and one or more apparatuses that are configured to remove clutter as discussed with FIG. 4 to FIG. 7, and to generate (determine) clutter calibration matrices, as discussed with FIG. 2 and FIG. 3.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIG. 1 to FIG. 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIG. 1 to FIG. 7 or operations thereof.

Embodiments and examples as described may also be carried out in the form of a computer process defined by a computer program or portions thereof. Embodiments of the functionalities described in connection with FIG. 1 to FIG. 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. The term "non-transitory," as used herein, is a limitation of the medium itself (i.e., tangible, not a signal) as opposed to a limitation on data storage persistency (e.g., random access memory RAM vs. read only memory ROM). Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
at least one processor; and
at least one memory storing instructions that, when executed by the at least one processor, cause the apparatus to at least:
obtain at least one predetermined clutter calibration matrix comprising a subset of clutter components determined based on a plurality of reference sensing results of an environment comprising clutter entities that are of no interest for detection and tracking of objects in the environment;
transform multi-dimensional representations of echo signals received during sensing the environment for detection and tracking of objects of interest in the environment at least partly into one-dimensional echo signals;
determine one-dimensional clutter contributing signals based on corresponding one-dimensional echo signals and at least one of the at least one clutter calibration matrix; and
remove clutter from multi-dimensional representations of said echo signals using the one-dimensional clutter contributing signals; and
based on the clutter removal, detect and track the objects of interest in the environment.

2. The apparatus of claim 1, wherein the at least one processor and the at least one memory storing instructions, when executed by the at least one processor, further cause the apparatus at least to:
remove the clutter by subtracting the one-dimensional clutter con-tributing signals from the one-dimensional echo signals; and
transform subtraction results into multi-dimensional representations of echo signals.

3. The apparatus of claim 1, wherein the at least one processor and the at least one memory storing instructions, when executed by the at least one processor, further cause the apparatus at least to:
transform the one-dimensional clutter contributing signals into multi-dimensional representations of clutter contributing signals; and
remove the clutter by subtracting the multi-dimensional representations of clutter contributing signals from the multi-dimensional representations of echo signals.

4. The apparatus of claim 1, wherein the at least one processor and the at least one memory storing instructions, when executed by the at least one processor, further cause the apparatus at least to apply, per a one-dimensional echo signal, a projection of one clutter calibration matrix to the one-dimensional echo signal to determine the one-dimensional clutter contributing signal.

5. The apparatus of claim 1, wherein the at least one processor and the at least one memory storing instructions, when executed by the at least one processor, further cause the apparatus at least to:
obtain at least one set of two or more clutter calibration matrices, that are based on one calibration matrix comprising the subset of clutter components determined based on a plurality of reference sensing results of the environment comprising the clutter entities, the two or more clutter calibration matrices in a set being pre-computed parts of a projection matrix of the one calibration matrix; and
determine, per a one-dimensional echo signal, the one-dimensional clutter contributing signal by multiplying the one-dimensional echo signal with the two or more clutter calibration matrices in sequence.

6. The apparatus of claim 1, wherein the at least one processor and the at least one memory storing instructions, when executed by the at least one processor, further cause the apparatus at least to:
receive echo signals during one sensing occasion over two or more beams;
obtain at least one predetermined clutter calibration matrix per a beam; and
remove clutter per a beam.

7. The apparatus of claim 1, wherein the at least one processor and the at least one memory storing instructions, when executed by the at least one processor, further cause the apparatus at least to:

slice, per a multi-dimensional representation of an echo signal, the multi-dimensional representation into a plurality of multi-dimensional chunks; and transform the multi-dimensional chunks at least partly into the one-dimensional echo signals.

8. The apparatus of claim 1, wherein the at least one processor and the at least one memory storing instructions, when executed by the at least one processor, further cause the apparatus at least to:

under-sample the multi-dimensional representations of echo signals received;

transform under-sampled representations of echo signals at least partly into the one-dimensional echo signals; and apply, after removing clutter, interpolation to the multi-dimensional representations of echo signals.

9. The apparatus of claim 1, wherein the at least one processor and the at least one memory storing instructions, when executed by the at least one processor, further cause the apparatus at least to:

obtain the plurality of reference sensing results;

transform reference sensing results at least partly into one-dimensional vectors comprising at least the frequency domain of the sensing results;

arrange the one-dimensional vectors to at least one two-dimensional matrix;

form, using the at least one two-dimensional matrix, at least one calibration matrix, wherein the at least one calibration matrix comprises vectors associated with clutter components in the at least one two-dimensional matrix;

determine at least one clutter calibration matrix based on the calibration matrix; and store the at least one clutter calibration matrix.

10. The apparatus of claim 9, wherein the at least one processor and the at least one memory storing instructions, when executed by the at least one processor, further cause the apparatus at least to scale at least one of the sensing results before transforming the at least one of sensing results into the one-dimensional vectors.

11. The apparatus of claim 9, wherein the at least one processor and the at least one memory storing instructions, when executed by the at least one processor, further cause the apparatus at least to:

under-sample the sensing results; and transform under-sampled sensing results at least partly into the one-dimensional vectors.

12. The apparatus of claim 9, wherein the at least one processor and the at least one memory storing instructions, when executed by the at least one processor, further cause the apparatus at least to determine at least one set of two or more clutter calibration matrices, that are based on one calibration matrix, the two or more clutter calibration matrices in a set being pre-computed parts of a projection matrix of the one calibration matrix.

13. The apparatus of claim 9, wherein the at least one processor and the at least one memory storing instructions, when executed by the at least one processor, further cause the apparatus at least to:

store reference sensing results on the environment comprising clutter entities;

obtain the reference sensing results according to an elapsed time between the obtaining and storing of a sensing result; and scale the reference sensing result obtained based on the elapsed time prior to transforming the reference sensing result into a one-dimensional vector.

14. The apparatus of claim 9, wherein the at least one processor and the at least one memory storing instructions, when executed by the at least one processor, further cause the apparatus at least to obtain the plurality of reference sensing results by performing transmitting sensing signals and obtaining representations of echoing signals.

15. The apparatus of claim 9, wherein the plurality of reference sensing results comprises a preset number of the reference sensing results.

16. A method comprising at least:

obtaining at least one predetermined clutter calibration matrix comprising a subset of clutter components determined based on a plurality of reference sensing results of an environment comprising clutter entities that are of no interest for detection and tracking of objects in the environment;

transforming multi-dimensional representations of echo signals received during sensing the environment for detection and tracking of objects of interest in the environment at least partly into one-dimensional echo signals;

determining one-dimensional clutter contributing signals based on corresponding one-dimensional echo signals and at least one of the at least one clutter calibration matrix; and removing clutter from multi-dimensional representations of said echo signals using the one-dimensional clutter contributing signals; and based on the clutter removal, detect and track the objects of interest in the environment.

17. An apparatus comprising:

at least one processor; and at least one memory storing instructions that, when executed by the at least one processor, cause the apparatus at least to:

obtain a plurality of reference sensing results of an environment comprising clutter entities that are of no interest for detection and tracking of objects in the environment, the plurality of the reference sensing results being a plurality of multi-dimensional representations of echo signals;

transform reference sensing results at least partly into one or more one-dimensional vectors comprising at least the frequency domain of the multi-dimensional representations of the echo signals;

arrange the one-dimensional vectors to at least one two-dimensional matrix;

extract clutter components from the at least one two-dimensional matrix by performing a singular value decomposition to the at least one two-dimensional matrix; determine, after the singular value decomposition, clutter order L of the one-dimensional vectors, by applying minimum description length;

extract vectors associated with the L strongest clutter components based on the clutter order to form the at least one calibration matrix;

form, at least one calibration matrix, wherein the at least one calibration matrix comprises vectors associated with the L strongest clutter components in the at least one two-dimensional matrix;

determine at least one clutter calibration matrix based on the at least one calibration matrix;

store the at least one clutter calibration matrix; and based on the determined at least one clutter calibration matrix, perform detection and tracking of objects of interest in the environment.

18. The apparatus of claim 17, wherein the at least one processor and the at least one memory storing instructions, when executed by the at least one processor, further cause the apparatus at least to scale at least one of the sensing results before transforming the at least one of sensing results into the one-dimensional vectors.

19. The apparatus of claim 17, wherein the at least one processor and the at least one memory storing instructions, when executed by the at least one processor, further cause the apparatus at least to:
    under-sample the sensing results; and
    transform under-sampled sensing results at least partly into the one-dimensional vectors.

* * * * *